TRIFLUOROMETHYLPHENYL CARBAMATES

Seymour L. Shapiro, Hastings on Hudson, and Louis Freedman, Bronxville, N.Y., assignors to U.S. Vitamin & Pharmaceutical Corporation, a corporation of Delaware No Drawing. Filed Apr. 9, 1958, Ser. No. 727,244

6 Claims. (Cl. 260—471)

This invention is concerned with α,α,α-trifluoromethyl-m-tolyl esters of alkyl and arylalkyl carbamic acids of the formula

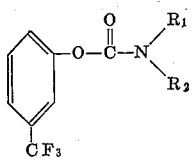

wherein $R_1$ is selected from the group consisting of lower alkyl and arylalkyl, and $R_2$ is selected from the group consisting of hydrogen and methyl.

These compounds have valuable pharmacological properties such as central nervous system depressants and ganglionic blocking agents.

The compounds wherein $R_2$=H are prepared by the reaction of m-trifluoromethylphenol with an alkyl isocyanate or arylalkylisocyanate by direct combination, or by heating in the presence of an organic solvent which is inert to the isocyanate. Desirably, a trace of pyridine is added to catalyze the condensation.

The compounds wherein $R_2$=$CH_3$ are prepared by reaction of m-trifluoromethylphenol with the N-methyl, N-alkyl or arylalkylcarbamyl chloride, such as dimethylcarbamyl chloride in an inert organic solvent in the presence of an acid acceptor, such as triethylamine. After a suitable reaction period, the formed triethylamine hydrochloride is separated and the product, after removal of the solvent, is obtained by distillation.

The synthesis of the new compounds of the present invention is described in the following examples.

Example 1

To a stirred refluxing solution of 8.1 g. (0.05 mole) of m-trifluoromethylphenol in 30 ml. of benzene and 10 ml. of triethylamine there was added dropwise 6.0 g. (0.056 mole) of dimethylcarbamyl chloride over 75 minutes.

Stirring and refluxing was continued for three hours. When cool, the formed triethylamine hydrochloride was separated and washed with benzene. The filtrate and the benzene washings were combined. The benzene was removed and the residue distilled. There was obtained 8.36 g. of the product, the dimethyl carbamate of m-trifluoromethylphenol distilling at 84–86° C. at 0.2–0.4 mm.

Anal.—Calcd. for $C_{10}H_{10}F_3NO_2$: C, 51.5; H, 4.3. Found: C, 51.7; H, 4.2.

Example 2

A mixture of 3.24 g. (0.02 mole) of m-trifluoromethylphenol and 1.36 g. (0.02 mole) of ethylisocyanate and 1 drop of pyridine was warmed under reflux in an oil bath maintained at 100° C. for one hour. When cool, the reaction mixture crystallized. After trituration with cold hexane there was obtained 2 g. of crystals which were recrystallized from hexane. The product, the ethylcarbamate of m-trifluoromethylphenol, melted at 52–53° C.

Anal.—Calcd. for $C_{10}H_{10}F_3NO_2$: C, 51.5; H, 4.3; N, 6.0. Found: C, 52.3; H, 4.5; N, 6.1.

Example 3

In a manner similar to that described in Example 2, there is obtained from n-butylisocyanate and m-trifluoromethylphenol, the n-butylcarbamate of m-trifluoromethylphenol, M.P. 43–44° C. (hexane).

Anal.—Calcd. for $C_{12}H_{14}F_3NO_2$: C, 55.2; H, 5.4; N, 5.4. Found: C, 54.7; H, 6.0; N, 5.0.

Example 4

The required β-phenylethylisocyanate for reaction with m-trifluoromethylphenol to obtain the β-phenethylcarbamate of m-trifluoromethylphenol was obtained in the following manner.

A solution of 46 g. (0.7 mole) of sodium azide in 150 ml. of water was cooled to 0° C. A solution of 84.0 g. (0.5 mole) of hydrocinnamyl chloride in 150 ml. of acetone was added slowly with stirring while the reaction temperature was maintained at 0–10° C. After an additional hour at 0° C., the water phase was removed and the organic phase added dropwise to 500 ml. of benzene which was maintained at 60° C. After one hour, when the evolution of nitrogen had ceased, the benzene solution of the product was treated with decolorizing carbon, filtered and the benzene removed. The residue, upon distillation, yielded β-phenylethylisocyanate, 60.0 g., boiling at 84–85° C. at 3.2 mm.

Anal.—Calcd. for $C_9H_9NO$: C, 73.5; H, 6.2; N, 9.5. Found: C, 73.4; H, 6.1; N, 9.5.

The new compounds may be used as medicaments, for example, in the form of pharmaceutical preparations which contain the compounds in admixture with a pharmaceutical organic or inorganic solid or liquid carrier suitable for oral or parenteral administration. For making these preparations there are used substances which do not react with the new compound, for example, water, gelatine, lactose, starches, magnesium stearate, talc, vegetable oils, benzyl alcohols, gums, polyalkylene glycols, petroleum jelly, cholesterol or another known carrier for medicaments.

The pharmaceutical preparations may be made up, for example, as tablets or in liquid form as solutions, suspensions or emulsions. If desired, they may be sterilized and/or may contain auxiliary substances such as preserving agents, stabilizing agents, wetting agents, emulsifying agents, salts for regulating the osmotic pressure, or buffers. They may also contain other therapeutically active substances. The preparations are made up by the usual methods.

It is to be understood that it is intended to cover all changes and modifications of the examples of the invention herein chosen for the purpose of illustration which do not constitute departures from the spirit and scope of the invention.

We claim:
1. The compound of the formula

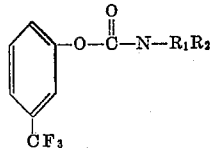

wherein $R_1$ is selected from the group consisting of lower alkyl, said alkyl having a carbon content $C_1$—$C_4$, and arylalkyl, said arylalkyl having a carbon content $C_7$—$C_8$, and $R_2$ is selected from the group consisting of hydrogen and methyl.

2. The compound
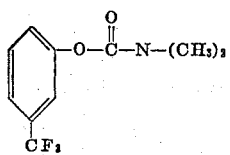
3. The compound
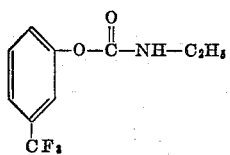
4. The compound
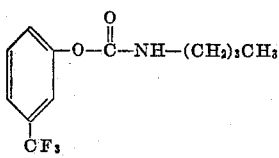
5. The compound
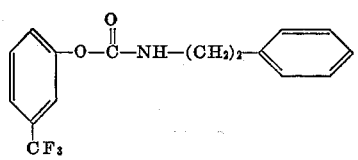
6. The compound
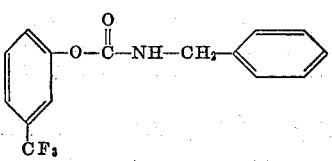
References Cited in the file of this patent
Leffler et al.: J. Am. Chem. Soc., 70, 3439–3442 (1948).
Oliverio et al.: J. Org. Chem., 20, 1734–1735 (1955).